Jan. 16, 1962 R. DOYLE 3,017,315
HEAT SEALING BAR
Filed June 13, 1958
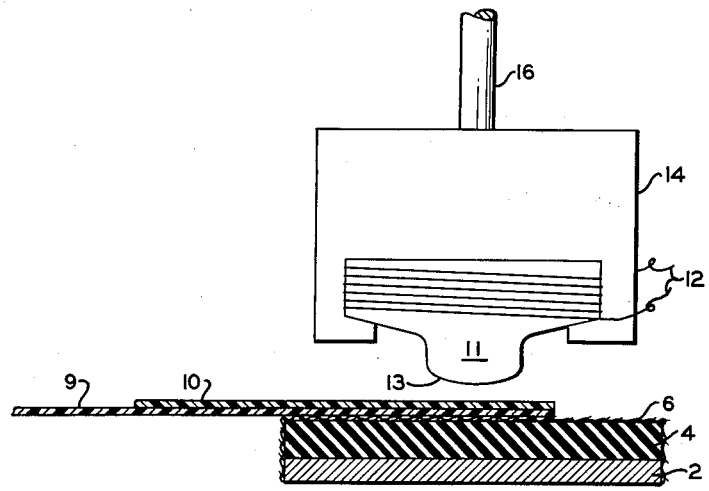
FIG. 1
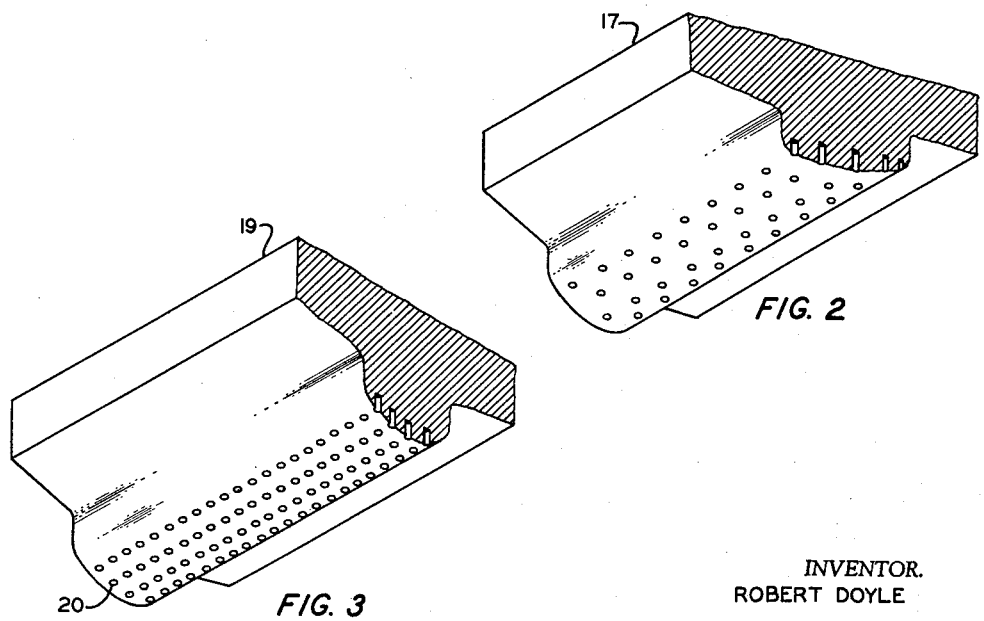
FIG. 2
FIG. 3
INVENTOR.
ROBERT DOYLE
BY Hudson and Young
ATTORNEYS

United States Patent Office 3,017,315
Patented Jan. 16, 1962

3,017,315
HEAT SEALING BAR
Robert Doyle, Bartlesville, Okla., assignor to Phillips Petroleum Company, a corporation of Delaware
Filed June 13, 1958, Ser. No. 741,830
7 Claims. (Cl. 156—581)

This application relates to heat sealing and an improved apparatus for sealing films of thermoplastics materials. In one aspect it relates to improved heat sealing bars for sealing films of high-density, highly crystalline olefin polymers.

The heat sealing of relative thin films of thermoplastic materials to one another presents a number of problems. In order to obtain an adequate seal between the films it is necessary to heat them to an elevated temperature to soften the thermoplastic material, and to apply sufficient pressure to the heated films to produce an autogenous bond therebetween. Due to the difficulty of controlling the sealing pressure and the amount of heat supplied, the thickness of the sealed portion is often unduly reduced, thereby reducing the strength of the film and providing an ineffective seal. Heat sealing bars or shoes used in the sealing of conventional or low density types of polyethylene film are straight and smooth and normally the face presented to the film is curved in cross-section, although not always. It has been found that these conventional bars have a very strong tendency to "heat cut" films prepared from high-density, highly crystalline olefin polymers. "Heating cutting," which results from excessive reduction in the thickness of the sealed film, leads to very weak joints which fail readily along the seal.

It is an object of this invention to provide an improved apparatus for sealing films of high-density, highly crystalline olefin polymers.

Another object of the invention is to provide an improved heat sealing bar, for sealing films of high-density, highly crystalline olefin polymers.

Still another object of this invention is to provide improved heat sealing bars for sealing films of highly dense, highly crystalline olefin polymers having sharp heat-softening points.

These and other objects of the invention will become more readily apparent from the following detailed description and discussion.

The foregoing objects are realized broadly by providing a heat sealing bar with a convex face having a series of openings engraved in and spaced across said face.

For the purpose of describing the invention and providing a better understanding thereof, reference is had to the accompanying drawings of which:

FIGURE 1 is an elevational view of a heat sealing apparatus in cross section,

FIGURE 2 is an isometric view of a heat sealing bar, and

FIGURE 3 is an elevational view of a heat sealing bar, all in accordance with my invention.

In the apparatus of FIGURE 1 reference numeral 4 designates a pliable platen made of rubber which is supported on plate 2 and is covered with a silicone-coated cloth 6. Above platen 4 is a heat sealing bar 11 having a projecting engraved convex face 13, said bar being held by bar holder 14 attached to shaft 16, which in turn is attached to an apparatus (not shown) by means of which said shaft is raised and lowered. A heating coil 12 is provided about sealing bar 11 whereby this bar can be maintained at the desired sealing temperature. When in the retracted position the bar 11, bar holder 14, and shaft 16, are elevated sufficiently above platen 4 whereby two or more thermoplastic films 9 and 10 can be inserted between said bar and the platen. In this particular illustration, films 9 and 10 are disposed one on top of the other for the purpose of sealing adjoining edges. The apparatus, however, can also be employed to seal overlapping edges of film, to provide a film of increased cross-section.

In the operation of the apparatus of FIGURE 1 with the sealing bar in the retracted position, two pieces of film 9 and 10, for example, film prepared from high-density, highly crystalline polyethylene are placed on platen 4 and cloth 6 as shown in the FIGURE. Sufficient heat is introduced through heating coil 12 whereby the sealing bar is elevated to and maintained at a temperature above the softening point of the polyethylene. The heat sealing bar is then lowered forcing films 9 and 10 and the convex portion 13 of said bar into the platen. The bar is maintained in the lowered position for a suitable period of time to form the seal, after which it is again retracted. The product of this operation is a water-tight seal with a minimum of strength loss in the film surrounding the seal due to heat cutting.

It is believed that the advantages provided by the improved heat sealing bar result from the reduction in area which is gained by engraving or perforating the convex surface of the bar. One arrangement which can be used to provide this reduction is shown in FIGURE 2. In the bar 17 of this FIGURE cylindrical uniformly spaced openings are provided in the convex face. Triangular spacing is employed and the holes are drilled to variable depths with the maximum depth occurring at the apex of the bar and the minimum depth at the outer surfaces of the convex face. Another arrangement is shown in FIGURE 3. In the bar 19 of this FIGURE the engraving is provided by circular openings 20 of equal depths with the openings being spaced from either side of the apex and no openings on the apex of the bar.

The arrangements shown in FIGURES 2 and 3 are merely illustrative of the types of engraving which can be employed. The openings can be of various shapes, for example, circular, in the form of squares, diamonds, etc. In general, it is desirable that the openings be regularly spaced and preferably uniform in size. However, a certain amount of discontinuity in the arrangement of the openings can be employed. The openings can be provided in different depths or all of the same depth, as desired. In general, with increasing depths the heat loss is greater and the temperature of the bar at the points of greater depth will be slightly less than at other points.

The apparatus of this invention finds particular application in the bonding of films of high-density, highly crystalline olefin polymers. These polymers include polymers of 1-olefins such as ethylene, propylene, 1-butene, 1-pentene, etc., also copolymers of monoolefins and diolefins, such as butadiene, isoprene, etc. The apparatus is particularly applicable to the sealing of films of polymers of 1-olefins having a maximum of 8 carbon atoms per molecule and no branching nearer the double bond in the 4 position, and more particularly ethylene polymers which have a specific gravity of at least 0.94 at 20° C. and preferably 0.96 and a crystallinity of at least 70 percent at ordinary room temperatures.

In a preferred polymerization method high molecular weight, highly dense crystalline polymers are prepared by the method described in detail in Hogan et al., U.S. 2,825,721, issued March 4, 1958. This particular method utilizes a chromium oxide catalyst containing hexavalent chromium associated with silica, alumina, zirconia, thoria, etc. In one embodiment of this patent olefins are polymerized in the presence of a hydrocarbon diluent, for example, an acyclic, alicyclic, or, less preferably, aromatic compound which is inert and in which the formed polymer is soluble. The reaction is ordinarily carried out at a temperature between about 150° F. and about 450° F. and usually under pressure sufficient to maintain the reactant and diluent in the liquid state.

The chromium oxide catalyst of Hogan et al. can also be employed in the preparation of higher molecular weight and essentially insoluble polymers. In the preparation of these polymers, it is usually desirable that the reaction temperature be maintained at a lower level usually not exceeding about 220° F. The polymers which are obtained are normally insoluble in the reaction diluent employed and are of exceedingly high molecular weight, from 100,000 or 200,000 or higher.

It is also possible to prepare high-density, highly crystalline polymers in the presence of organometallic compounds such as triethylaluminum, plus titanium tetrachloride, mixtures of ethyl aluminum halides with titanium tetrachloride, and the like. Another group of catalyst which is used comprises a halide of a group IV metal, such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and alumina.

In addition to the foregoing, high-density, highly crystalline polymers prepared by other methods can be utilized in the form of films with the apparatus of the invention.

To provide effective bonding of the films it is necessary that they be subjected to temperatures above their softening points, thus it is desirable that the platen and sealing bar be heated to elevated temperatures, usually between about 30 and about 100° F. above the softening point of the films. The pressure employed in the sealing operation is preferably the minimum which is necessary to force the film and face of the heat sealing bar into the platen, in the ordinary operation between about 20 and 60 p.s.i.g. The time required to effect sealing will vary depending on the particular type of films being sealed and the thickness of the film. More usually effective sealing can be obtained with a contact time of between about 0.001 and 0.5 minute. For example, when sealing high density, highly crystalline polyethylene, prepared by the method of Hogan et al., in the form of films having a thickness of 2 mils (0.002 inch) a good seal is obtained by heating the sealing bar and platen to a temperature about 40° F. above the softening point of the polymer and subjecting the films to this temperature at a pressure of about 40 p.s.i.g. for a period of about 0.5 second.

Usually the films to be joined are of the same polymer, however, it is within the scope of the invention to bond films of different polymers and/or of different thicknesses. Also, apparatus of this invention can be used for joining polymer film to other materials, such as, other types of polymers, paper, wood, etc., said other materials having a softening point in the same temperature range as the high density, highly crystalline polymer, or higher. Various thicknesses of film can be joined; however, usually it is preferred that the film thickness is at least 0.1 mil (0.0001 inch) and does not exceed about 12 mils (0.012 inch).

The following data are presented in illustration of one embodiment of the invention.

Heat sealing tests were carried out on two-mil blown polyethylene tubing using a conventional non-engraved heating bar and heating bars engraved as shown in FIGURES 2 and 3. The polyethylene film was prepared from polymer prepared in accordance with the method of Hogan et al., in the presence of cyclohexane and a catalyst comprising about 2.5 percent by weight of chromium as chromium oxide, containing hexavalent chromium, with silica-alumina. The catalyst was prepared by impregnating silica-alumina with a solution of chromium oxide, followed by drying and activation in air at elevated temperatures. The conditions employed in the preparation of the polymer were generally as follows:

Reactor temperature _____ 285° F.
Reactor pressure _____ 500 p.s.i.
Polymer concentration _____ 8–10 weight percent.[1]
Catalyst concentration _____ 0.3 weight percent.[1]

[1] Based on cyclohexane diluent.

The sealing tests were carried out on pieces of film measuring about 3 x 5 inches in a Sentinel heat sealing apparatus, utilizing a bar pressure of 40 pounds per square inch. Two types of engraved bars were used in carrying out the tests; one bar had circular engraved openings about 1/16 inch in diameter spaced in a straight line about 1/8 in. apart from center to center parallel to the apex of the face of the sealing bar, with no openings on the apex. The other engraved bar contained circular openings spaced in a triangular arrangement about 3/32 of an inch apart uniformly across the face of the bar, including the apex.

*Example I*

Three film samples were sealed, utilizing an engraved bar at a temperature of 300° F. with a sealing time of 0.5 sec. A very good seal was obtained with little or no heat cutting of the film. Another film was subjected to the same conditions, utilizing a conventional non-engraved heat sealing bar. While it was apparent by visual examination that the film so treated had been subjected to heat, no seal was obtained.

*Example II*

Four samples of film were sealed with the engraved bars at 310° F. with a sealing time of 0.6 sec. Again very effective seals were obtained with only a slight amount of heat cutting. It was again attempted to seal film under the same conditions utilizing a conventional bar; however, no seal was obtained.

*Example III*

Additional tests were carried out with the conventional sealing bar and it was found necessary to increase the sealing temperature to 325° F. and the sealing time to 1.0 sec. before an effective seal could be obtained with the conventional bar. Eight tests were carried out under these conditions. In six of the tests the film was cut through during the heat sealing operation, either partially or across the entire film sample.

It is apparent from the foregoing data that the engraved heating bars of this invention provide effective sealing at substantially lower temperatures and lower sealing times than conventional bars and with a minimum of heat cutting of the sealed film.

Having thus described the invention by providing specific examples thereof, it is to be understood that no undue limitations or restrictions are to be drawn by reason thereof and that many variations and modifications are within the scope of the invention.

I claim:

1. A heat sealing bar with a smooth convex, continuous heating face having separated openings spaced across said face.

2. The bar of claim 1 in which said openings are circular in shape.

3. The bar of claim 1 in which said openings are of equal depth.

4. The bar of claim 1 in which said openings are of decreasing depth extending from the apex of said face.

5. The bar of claim 1 in which said openings are uniformly spaced in a triangular arrangement.

6. The bar of claim 5 in which the apex of said face is free from openings.

7. The bar of claim 6 in which said openings are circular in shape.

References Cited in the file of this patent

UNITED STATES PATENTS

| | | |
|---|---|---|
| 1,628,203 | Stein | May 10, 1927 |
| 2,468,965 | Ekstrom | May 3, 1949 |
| 2,556,452 | Spalding | June 12, 1951 |
| 2,712,343 | Stanton | July 5, 1955 |
| 2,730,161 | Langer | Jan. 10, 1956 |
| 2,768,272 | Lesher | Oct. 23, 1956 |

FOREIGN PATENTS

| | | |
|---|---|---|
| 128,096 | Switzerland | Nov. 1, 1928 |